United States Patent
Toyoda et al.

(10) Patent No.: US 7,746,567 B2
(45) Date of Patent: Jun. 29, 2010

(54) IMAGE PICKUP APPARATUS

(75) Inventors: Takashi Toyoda, Daito (JP); Yoshizumi Nakao, Daito (JP); Yoshimasa Imahori, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 12/391,786

(22) Filed: Feb. 24, 2009

(65) Prior Publication Data

US 2009/0225443 A1 Sep. 10, 2009

(30) Foreign Application Priority Data

Mar. 6, 2008 (JP) .............................. 2008-055691

(51) Int. Cl.
*G02B 17/00* (2006.01)
*G02B 27/12* (2006.01)

(52) U.S. Cl. ...................................... 359/737; 359/640

(58) Field of Classification Search ................. 359/625, 359/638, 640, 737, 738, 739, 811
See application file for complete search history.

(56) References Cited

FOREIGN PATENT DOCUMENTS

| | | |
|---|---|---|
| JP | 3566100 | 6/2004 |
| JP | 2004-328045 | 11/2004 |
| JP | 2005-167442 | 6/2005 |
| JP | 2006-246193 | 9/2006 |
| JP | 2007-295141 | 11/2007 |
| WO | 2005/024508 | 3/2005 |

OTHER PUBLICATIONS

Patent Abstracts of Japan for Japanese Publication No. 2004-328045, Publication date Nov. 18, 2004 (1 page).
Patent Abstracts of Japan for Japanese Publication No. 2000-089301, Publication date Mar. 31, 2000 (1 page) (Corresponds to JP3566100).
Patent Abstracts of Japan for Japanese Publication No. 2005-167442, Publication date Jun. 23, 2005 (1 page).
Patent Abstracts of Japan for Japanese Publication No. 2006-246193, Publication date Sep. 14, 2006 (1 page).
Patent Abstracts of Japan for Japanese Publication No. 2007-295141, Publication date Nov. 8, 2007 (1 page).

*Primary Examiner*—William C Choi
(74) *Attorney, Agent, or Firm*—Osha • Liang LLP

(57) ABSTRACT

An image pickup apparatus includes a first lens for converging light incident thereto through a first field area, a first prism to which light is incident through a second field area at a right of the first field area, a second lens for converging the light emitted from the first prism, a second prism to which light is incident through a third field area at a left of the first field area, and a third lens for converging the light emitted from the second prism. The respective lenses are placed at areas corresponding to the vertices of a triangle in a front view.

4 Claims, 7 Drawing Sheets

IMAGE PICKUP APPARATUS

BACKGROUND OF THE INVENTION

1. Field of the Invention

The present invention relates to an image pickup apparatus including lenses.

2. Description of the Related Art

Conventionally, there have been known various types of image pickup apparatuses including lenses (refer to Japanese Laid-Open Patent Publication No. 2004-328045, Japanese Patent No. 3566100, Domestic Re-publication of PCT International Publication No. WO2005/024508, Japanese Laid-Open Patent Publication Nos. 2005-167442, 2006-246193 and 2007-295141, for example).

The aforementioned patent documents Nos. 2004-328045, 3566100 and WO2005/024508 disclose image pickup apparatuses including lenses and prisms and being capable of picking-up images of plural view fields. The aforementioned patent documents Nos. 2005-167442, 2006-246193 and 2007-295141 disclose image pickup apparatuses including plural lenses and being capable of reducing thicknesses.

Further, conventionally, there has been known an image pickup apparatus including a wide angle lens and being capable of picking-up an image of panoramic image.

However, the conventional image pickup apparatus including wide angle lenses have a problem that barrel-shaped distortions occur around a picked-up image.

Therefore, conventionally, in order to overcome the aforementioned problem, there has been suggested an image pickup apparatus including a lens (a first lens) for converging light incident from its front side (a first area), a prism (a first optical-path changing member) to which light is incident at its right side (a second area), a lens (a second lens) for converging the light emitted from the prism, a prism (a second optical-path changing member) to which light is incident at its left side (a third area), and a lens (a third lens) for converging the light emitted from the prism. In such an image pickup apparatus, the three lenses are placed in a line in a horizontal direction. Further, in such an image pickup apparatus, by picking-up and synthesizing the light converged by the three lenses, it is possible to pick-up a panoramic image, while suppressing the occurrence of barrel-shaped distortions.

SUMMARY OF THE INVENTION

Although the image pickup apparatus conventionally suggested as described above is capable of picking up a panoramic image while suppressing the occurrence of barrel-shaped distortions, there is a problem of the necessity of reducing sizes of the image pickup areas, in order to suppress the occurrence of cross talks.

The image pickup apparatuses disclosed in the aforementioned patent documents make no suggestion or description of a structure for picking-up a panoramic image.

The present invention was made in order to overcome the aforementioned problems and aims at providing an image pickup apparatus capable of picking-up a panoramic image while suppressing the occurrence of barrel-shaped distortions and also capable of suppressing the reduction of the size of the image pickup area.

An image pickup apparatus according to the present invention is an image pickup apparatus including a first lens for converging light incident thereto through a first area, and further includes a first optical-path changing member to which light is incident through a second area at a right of the first area; a second lens for converging the light emitted from the first optical-path changing member; a second optical-path changing member to which light is incident through a third area at a left of the first area; and a third lens for converging the light emitted from the second optical-path changing member; wherein the first lens, the second lens and the third lens are placed at areas corresponding to the vertices of a triangle in a front view.

With this structure, it is possible to pick-up a panoramic image by picking-up light converged by the first, second and third lenses and synthesizing them while suppressing the occurrence of barrel-shaped distortions. Further, it is possible to suppress the reduction of the sizes of the image pickup areas, while suppressing the occurrence of cross talks, in comparison with the case where three lenses are placed in a line in the horizontal direction with smaller distances provided between the lenses.

In the aforementioned image pickup apparatus, the first lens may be placed such that a distance from the first lens to the second lens is substantially equal to a distance from the first lens to the third lens, and a line connecting the first lens and the second lens and a line connecting the first lens and the third lens form substantially the same angle to a line connecting the second lens and the third lens.

With this structure, when the first optical-path changing member is provided at an area corresponding to the second lens and the second optical-path changing member is provided at an area corresponding to the third lens, it is possible to suppress the influence of the first optical-path changing member and the second optical-path changing member on the light incident from the first area to the first lens. As a result, it is possible to suppress the degradation of the image quality of a picked-up panoramic image.

The image pickup apparatus may further include an image pickup device to which light is incident through the first, second and third lenses, and a light shielding member provided between the first, second and third lenses and the image pickup device.

With this structure, it is possible to adjust the light-ray reaching areas with the light shielding member, and accordingly the image pickup areas can be enlarged, while suppressing the occurrence of cross talks.

In the above image pickup apparatus, the first optical-path changing member may be provided at an area corresponding to the second lens, and the second optical-path changing member may be provided at an area corresponding to the third lens.

With this structure, it is possible to easily emit the light from the second area toward the second lens through the first optical-path changing member, and also it is possible to easily emit the light from the third area toward the third lens through the second optical-path changing member.

According to the present invention, it is possible to provide an image pickup apparatus capable of picking-up a panoramic image while suppressing the occurrence of barrel-shaped distortions and also capable of suppressing the reduction of the sizes of the image pickup areas.

DETAILED DESCRIPTION OF THE PREFERRED EMBODIMENTS

Hereinafter, an embodiment of the present invention will be described, with reference to the drawings.

Figure 1:
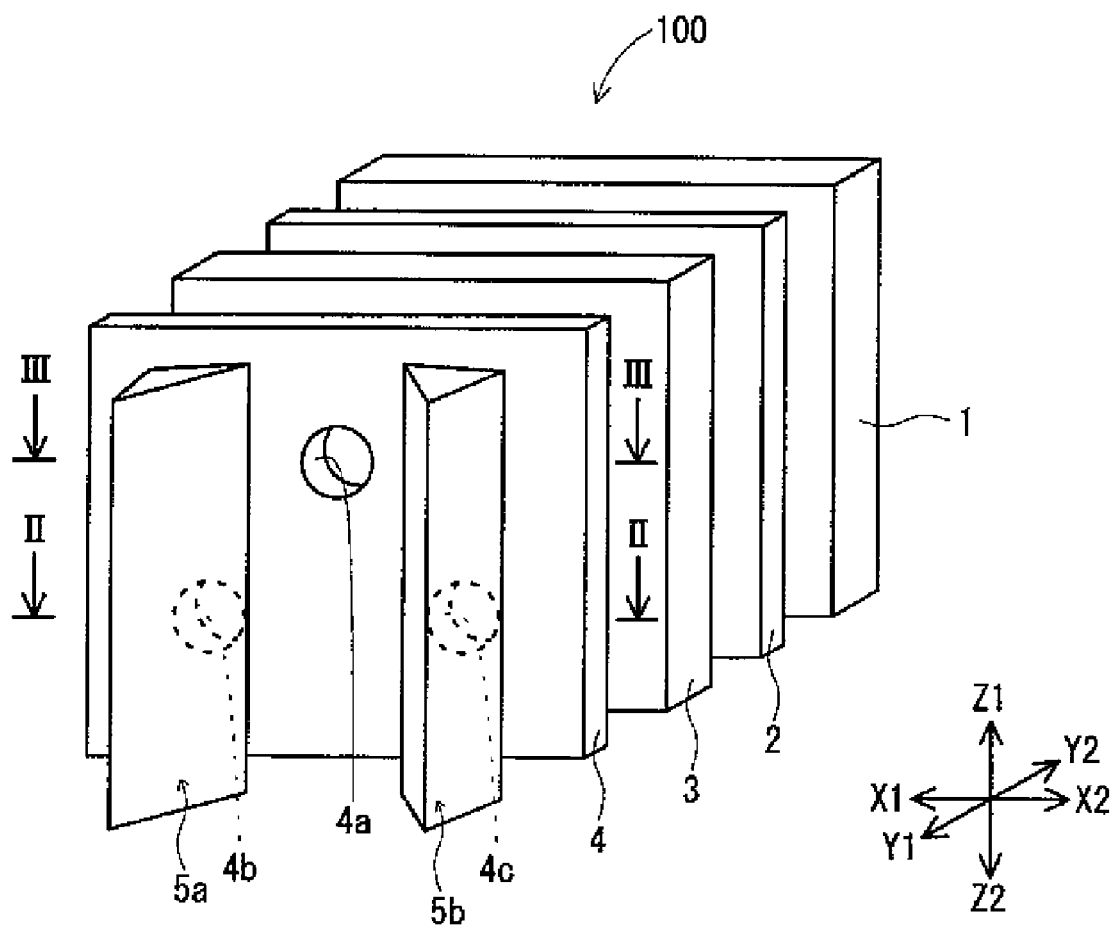
FIG. 1 is an exploded perspective view illustrating the overview of the entire structure of an image pickup apparatus according to an embodiment of the present invention.

FIG. 1 is an exploded perspective view illustrating the overview of the entire structure of an image pickup apparatus according to an embodiment of the present invention. FIGS. 2 to 6 are views illustrating the structure of the image pickup apparatus illustrated in FIG. 1. First, with reference to FIGS. 1 to 6, there will be described the structure of an image pickup apparatus 100 according to the present embodiment.

The image pickup apparatus 100 according to an embodiment of the present invention includes an image pickup device 1, a partition wall 2, a lens holder 3, a diaphragm member 4, and prisms 5a and 5b as illustrated in FIG. 1.

Figure 2:
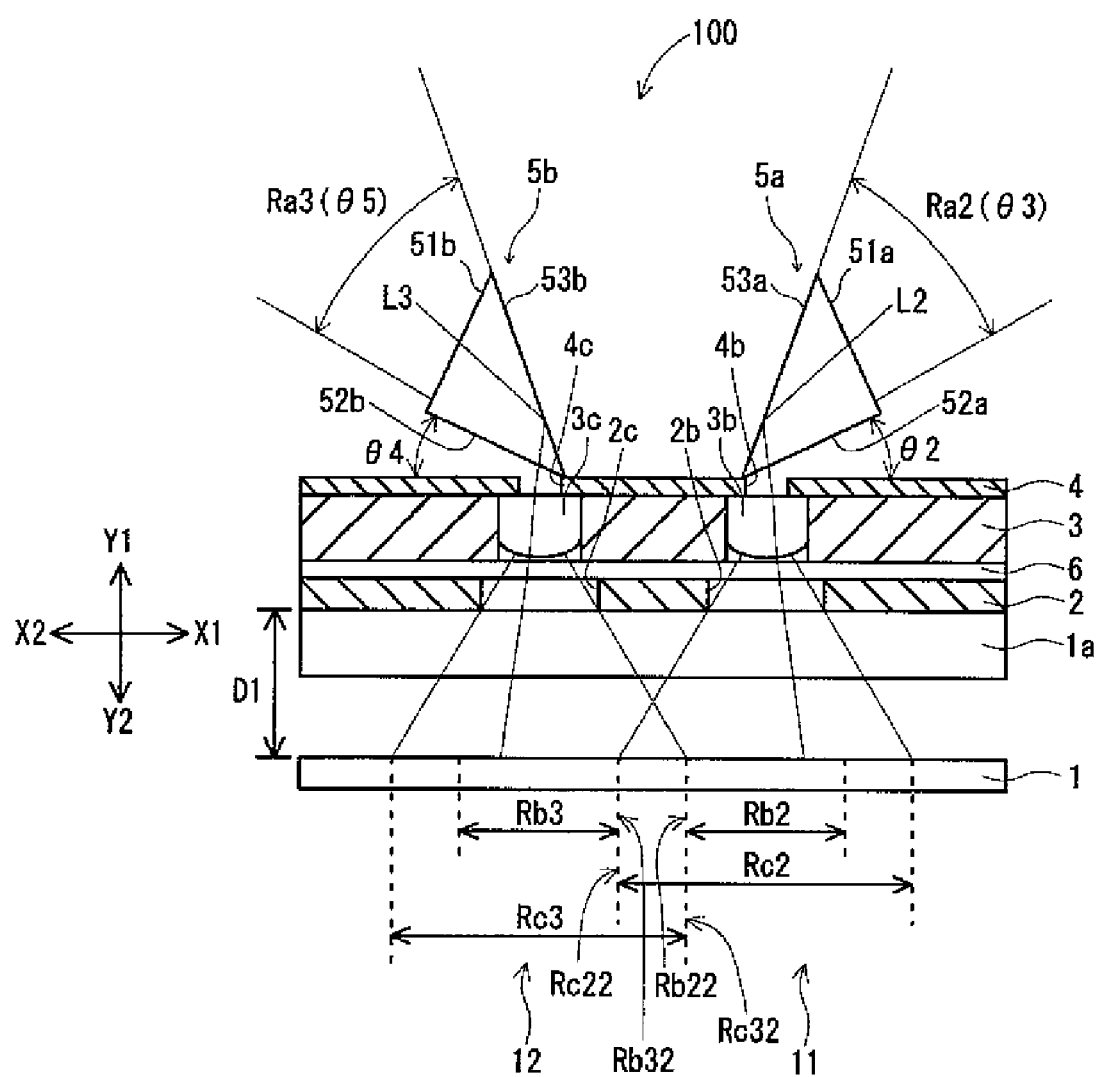
FIG. 2 is a cross-sectional view along the line II-II in FIG. 1.
Figure 3:
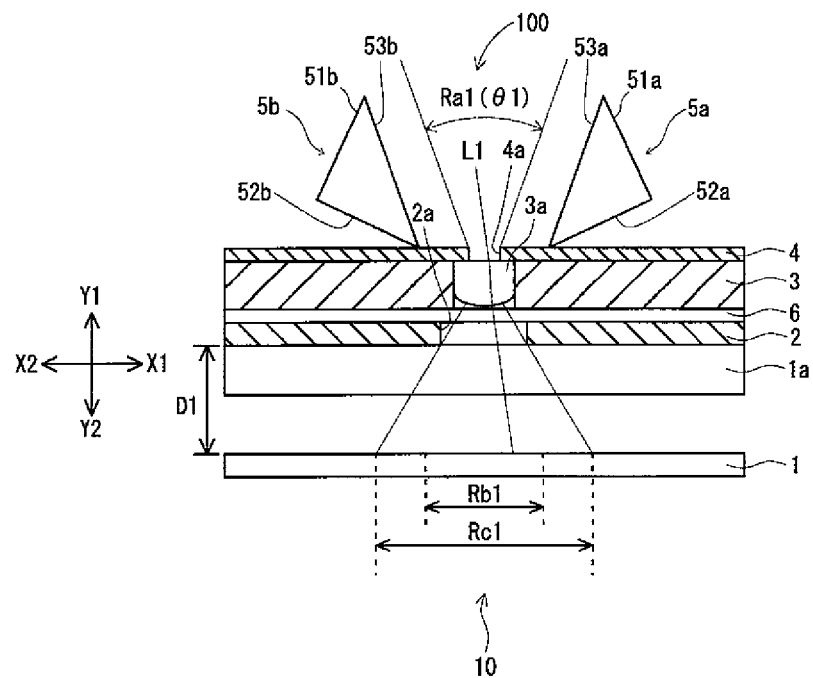
FIG. 3 is a cross-sectional view along the line III-III in FIG. 1.

The image pickup device 1 is constituted by a CCD (Charge Coupled Device) image pickup device, a CMOS image pickup device or the like and is provided within a package including a cover glass 1a (see FIG. 2 and FIG. 3). Further, the image pickup device 1 is provided substantially in parallel with the surface of the cover glass 1a, with an interval D1 interposed therebetween, as illustrated in FIG. 2 and FIG. 3. FIG. 2 is a cross-sectional view along the line II-II in FIG. 1, and FIG. 3 is a cross-sectional view along the line III-III in FIG. 1.

Figure 4:
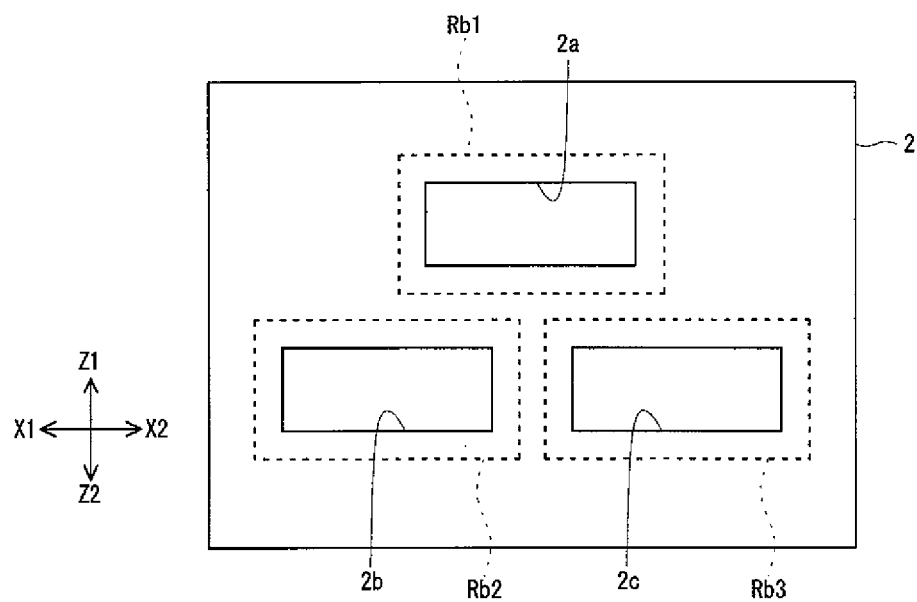
FIG. 4 is a view illustrating a partition wall in the image pickup apparatus in FIG. 1.

The partition wall 2 has a light shielding property and is provided on the surface of the cover glass 1a. This partition wall 2 is provided for adjusting light-ray reaching areas Rc1, Rc2 and Rc3. Further, as illustrated in FIG. 4, a partition wall 2 is provided with rectangular-shaped opening portions 2a to 2c, at its areas corresponding to the vertices of a triangle, in a front view (view in the direction of Y2 in FIG. 1). The partition wall 2 is an example of "light shielding member" according to the present invention.

As illustrated in FIG. 2 and FIG. 3, an infrared-ray cutting filter 6 for eliminating near-infrared rays is provided on the surface of the partition wall 2.

Figure 5:
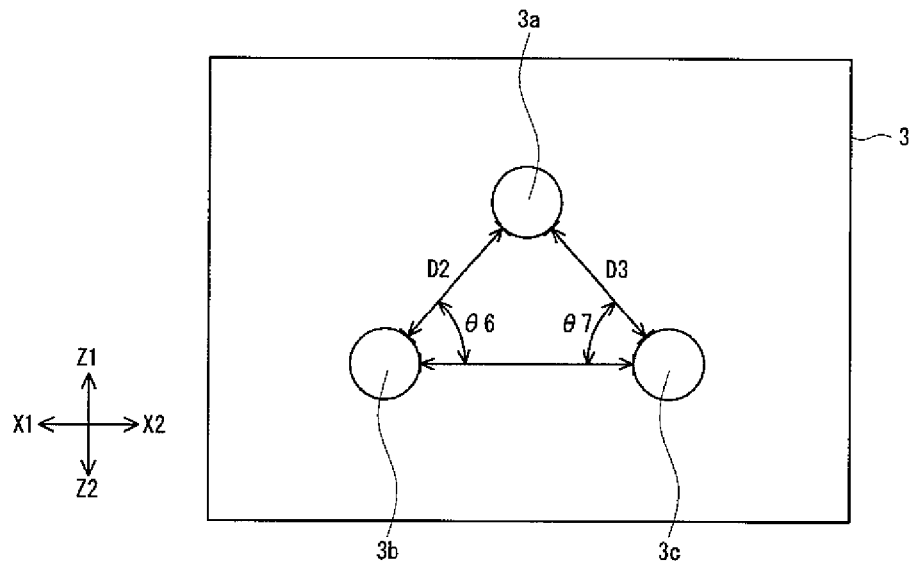
FIG. 5 is a view illustrating a lens holder in the image pickup apparatus in FIG. 1.

In the present embodiment, the lens holder 3 is provided on the surface of an infrared-ray cutting filter 6. Further, the lens holder 3 holds lenses 3a to 3c at its areas corresponding to the vertices of a triangle, in a front view, as illustrated in FIG. 5. The lens 3a is placed, such that a distance D2 from the lens 3a to the lens 3b and a distance D3 from the lens 3a to the lens 3c are substantially equal to each other. A line connecting the lens 3b and the lens 3c, and a line connecting the lens 3a and the lens 3b form an angle θ6. A line connecting the lens 3b and the lens 3c, and a line connecting the lens 3a and the lens 3c form an angle θ7 which is substantially equal to the angle θ6.

The lenses 3a to 3c are provided at the areas corresponding to the opening portions 2a to 2c of the partition wall 2, as illustrated in FIG. 2 and FIG. 3. Further, the lenses 3a to 3c are plano-convex lenses and have a view angle of about 40 degrees. The lenses 3a, 3b and 3c are examples of "first lens", "second lens" and "third lens" according to the present invention, respectively.

The lens 3a is provided for converging a light ray L1 incident thereto from a field area Ra1 having an angular range of θ1 (about 40 degrees, in the present embodiment) into an image pickup area Rb1 of the image pickup device 1, as illustrated in FIG. 3. The light ray L1 in FIG. 3 is an example of the light ray which is converged from the field area Ra1 into the image pickup area Rb1. The field area Ra1 is an example of "first area" according to the present invention.

The lens 3b is provided for converging a light ray L2 incident thereto from the prism 5a into an image pickup area Rb2 of the image pickup device 1, as illustrated in FIG. 2. The lens 3c is provided for converging a light ray L3 incident thereto from the prism 5b into an image pickup area Rb3 of the image pickup device 1.

The diaphragm member 4 has a light shielding property and is provided on the surface of the lens holder 3. This diaphragm member 4 is provided for adjusting the amount of light incident to the lenses 3a to 3c. As illustrated in FIG. 1, the diaphragm member 4 is provided with circular-shaped opening portions 4a to 4c at its areas corresponding to the vertices of a triangle, in a front view. The opening portions 4a to 4c are provided at the areas corresponding to the lenses 3a to 3c, respectively, as illustrated in FIG. 2 and FIG. 3.

The prism 5a is formed to have a right isosceles triangle shape in a plane view and is formed to extend in a direction of Z1 (see FIG. 1), as illustrated in FIG. 2. This prism 5a has a light incident surface 51a, a light emitting surface 52a which is a surface orthogonal to the light incident surface 51a, and a light reflecting surface 53a. Further, the prism 5a is provided at an area corresponding to the opening portion 4b of the diaphragm member 4. The prism 5a is an example of "first optical-path changing member" according to the present invention.

The prism 5a is provided such that an inclination angle of the light emitting surface 52a with respect to the surface of the diaphragm member 4 is θ2 (about 25 degrees, in the present embodiment). Further, the prism 5a is provided for emitting the light ray L2 incident thereto from a field area Ra2 at the right (in a direction of X1) of the field area Ra1 (see FIG. 3), toward the lens 3b. More specifically, the light ray L2 is incident thereto through the light incident surface 51a, and this light ray L2 is reflected by the light reflecting surface 53a. Thereafter, the light ray L2 is emitted therefrom through the light emitting surface 52a. The field area Ra2 has an angular range of θ3 (about 40 degrees, in the present embodiment). The light ray L2 in FIG. 2 is an exemplary light ray which is converged from the field area Ra2 into the image pickup area Rb2. The field area Ra2 is an example of "second area" according to the present invention.

The prism 5b is formed to have a right isosceles triangle shape in a plane view and is formed to extend in the direction of Z1 (see FIG. 1). This prism 5b has a light incident surface 51b, a light emitting surface 52b which is a surface orthogonal to the light incident surface 51b, and a light reflecting surface 53b. Further, the prism 5b is provided in an area corresponding to the opening portion 4c of the diaphragm member 4. The prism 5b is an example of "second optical-path changing member" according to the present invention.

The prism 5b is provided such that an inclination angle of the light emitting surface 52b with respect to the surface of the diaphragm member 4 is θ4 (about 25 degrees, in the present embodiment). Further, the prism 5b is provided for emitting the light ray L3 incident from a field area Ra3 at a left (in a direction of X2) of the field area Ra1 (see FIG. 3), toward the lens 3c. More specifically, the light ray L3 is incident thereto through the light incident surface 51b, and this light ray L3 is reflected by the light reflecting surface 53b. Thereafter, the light ray L3 is emitted therefrom through the light emitting surface 52b. The field area Ra3 has an angular range of θ5 (about 40 degrees, in the present embodiment). The light ray L3 in FIG. 2 is an exemplary light ray which is converged from the field area Ra3 into the image pickup area Rb3. The field area Ra3 is an example of "third area" according to the present invention.

As illustrated in FIG. 3, in the image pickup apparatus 100, the image pickup area Rb1 of the image pickup device 1, the opening portion 2a of the partition wall 2, the lens 3a and the opening portion 4a of the diaphragm member 4 constitute a unit (ommatidium) 10 for picking-up an image of the field area Ra1. In the unit 10, the image pickup area Rb1 is formed within the light-ray reaching area Rc1.

Further, as illustrated in FIG. 2, in the image pickup apparatus 100, the image pickup area Rb2 of the image pickup device 1, the opening portion 2b of the partition wall 2, the lens 3b, the opening portion 4b of the diaphragm member 4 and the prism 5a constitute a unit (ommatidium) 11 for picking-up an image of the field area Ra2 at a right of the field area Ra1 (see FIG. 3). In the unit 11, the image pickup area Rb2 is formed within the light-ray reaching area Rc2.

Further, in the image pickup apparatus 100, the image pickup area Rb3 of the image pickup device 1, the opening portion 2c of the partition wall 2, the lens 3c, the opening portion 4c of the diaphragm member 4 and the prism 5b constitute a unit (ommatidium) 12 for picking-up an image of the field area Ra3 at the left of the field area Ra1 (see FIG. 3). In the unit 12, the image pickup area Rb3 is formed within the light-ray reaching area Rc3.

Figure 6:
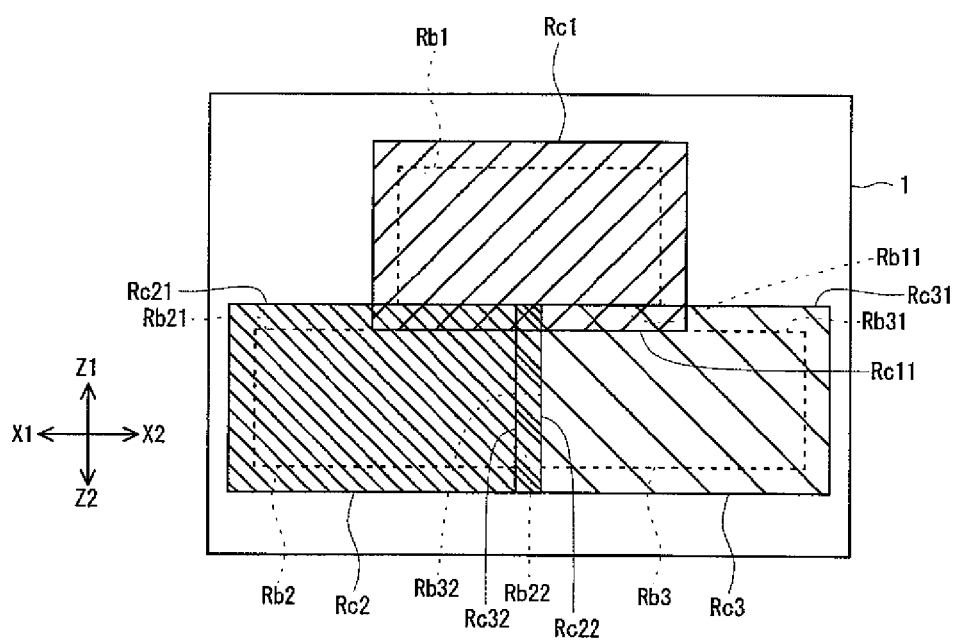
FIG. 6 is a view illustrating an image pickup device in the image pickup apparatus in FIG. 1.

The units 10 to 12 are placed at areas corresponding to the vertices of a triangle in a front view. As illustrated in FIG. 6, the image pickup area Rb1 of the unit 10 is provided such that its end portion Rb11 in a direction of Z2 is adjacent to an end portion Rc21 of the light-ray reaching area Rc2 of the unit 11 in the direction of Z1 and to an end portion Rc31 of the light-ray reaching area Rc3 of the unit 12 in the direction of Z1.

The light-ray reaching area Rc1 of the unit 10 is formed such that the vicinity of its end portion Rc11 in the direction of Z2 is overlapped with the vicinity of the end portion Rc21 of the light-ray reaching area Rc2 of the unit 11 in the direction of Z1 and with the vicinity of the end portion Rc31 of the light-ray reaching area Rc3 of the unit 12 in the direction of Z1. Further, the light-ray reaching area Rc1 of the unit 10 is formed such that its end portion Rc11 in the direction of Z2 is adjacent to an end portion Rb21 of the image pickup area Rb2 of the unit 11 in the direction of Z1 and to the end portion Rb31 of the image pickup area Rb3 of the unit 12 in the direction of Z1.

As illustrated in FIG. 2 and FIG. 6, the image pickup area Rb2 of the unit 11 is provided such that its end portion Rb22 in the direction of X2 is adjacent to an end portion Rc32 of the light-ray reaching area Rc3 of the unit 12 in the direction of X1. The image pickup area Rb3 of the unit 12 is provided such that its end portion Rb32 in the direction of X1 is adjacent to an end portion Rc22 of the light-ray reaching area Rc2 of the unit 11 in the direction of X2. The light-ray reaching area Rc2 of the unit 11 is formed, such that the vicinity of its end portion Rc22 in the direction of X2 is overlapped with the vicinity of the end portion Rc32 of the light-ray reaching area Rc3 of the unit 12 in the direction of X1.

The image pickup apparatus 100 is provided with a processing unit (not illustrated) for synthesizing images picked-up by the units 10 to 12 into a single image.

In the present embodiment, as described above, there are provided the unit 10 for picking-up an image of the field area Ra1, the unit 11 for picking-up an image of the field area Ra2 at the right of the field area Ra1, and the unit 12 for picking-up an image of the field area Ra3 at the left of the field area Ra1. Accordingly, by synthesizing the images picked-up through the units 10 to 12, it is possible to pick-up a panoramic image with an angular range of about 120 degrees, while suppressing the occurrence of barrel-shaped distortions.

Further, in the present embodiment, the units 10 to 12 are placed at the areas corresponding to the vertices of a triangle in a front view. This can suppress the reduction of sizes of the image pickup areas Rb1 to Rb3 of the units 10 to 12, while suppressing the occurrence of cross talks, in comparison with the case where units are placed in a line in the horizontal direction with smaller distances therebetween.

Further, in the present embodiment, the partition wall 2 is provided for adjusting the light-ray reaching areas Rc1, Rc2 and Rc3. This enables the image pickup areas Rb1 to Rb3 of the units 10 to 12 to be enlarged, while suppressing the occurrence of cross talks. More specifically, since it is possible to make distances between the units smaller while suppressing the occurrence of cross talks, the image pickup areas Rb1 to Rb3 of the units 10 to 12 can be enlarged. As a result, it is possible to enlarge the range usable as the image pickup area of the image pickup device 1.

By providing the prism 5a, it is possible to easily emit the light ray L2 from the field area Ra2 toward the lens 3b, and it is possible to easily emit the light ray L3 from the field area Ra3 toward the lens 3c as well.

In the present embodiment, the prism 5a is provided in an area corresponding to the lens 3b, and the prism 5b is provided in an area corresponding to the lens 3c. Further, the distance D2 from the lens 3a to the lens 3b and the distance D3 from the lens 3a to the lens 3c are made substantially equal. Accordingly, when picking-up an image of the field area Ra1 by the unit 10, it is possible to suppress the influence of the prisms 5a and 5b on the unit 10. As a result, it is possible to suppress the degradation of the image quality of a picked-up panoramic image.

Figure 7:
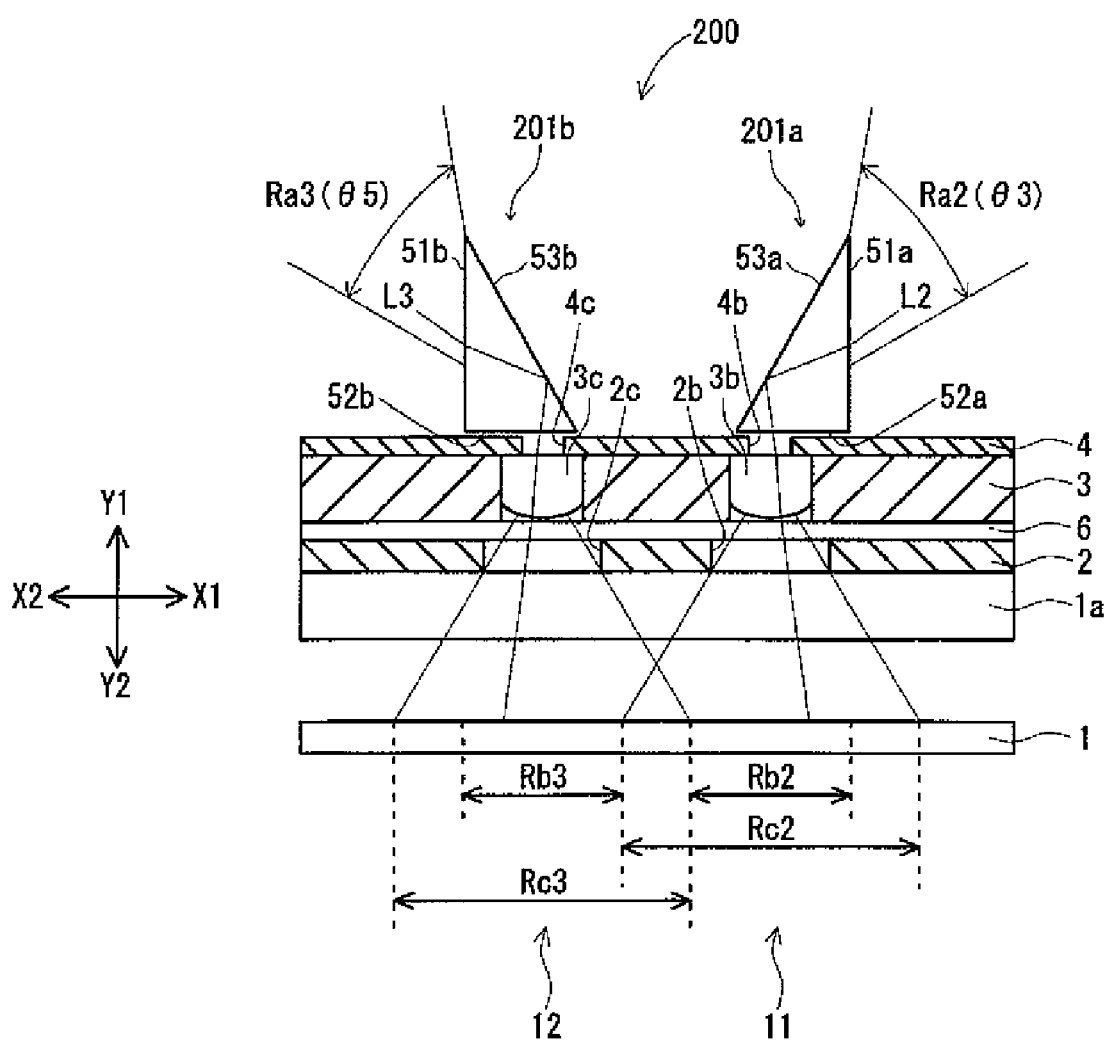
FIG. 7 is a cross-sectional view illustrating an image pickup apparatus according to a first modified example of the present embodiment.

The present invention can employ various types of embodiments other than the aforementioned embodiment. In the aforementioned embodiment, there has been described a case where the prisms 5a and 5b are formed to have a right isosceles triangle shape in a plane view. However, the present invention is not limited thereto. For example, as in an image pickup apparatus 200 illustrated in FIG. 7 according to a first modified example of the present embodiment, the prisms 201a and 201b may be formed to have a right triangle shape having angles of 30 degrees and 60 degrees in a plane view. With this structure, when picking-up an image of the field area Ra1 by the unit 10, it is possible to further suppress the influence of prisms 201a and 201b on the unit 10.

Figure 8:
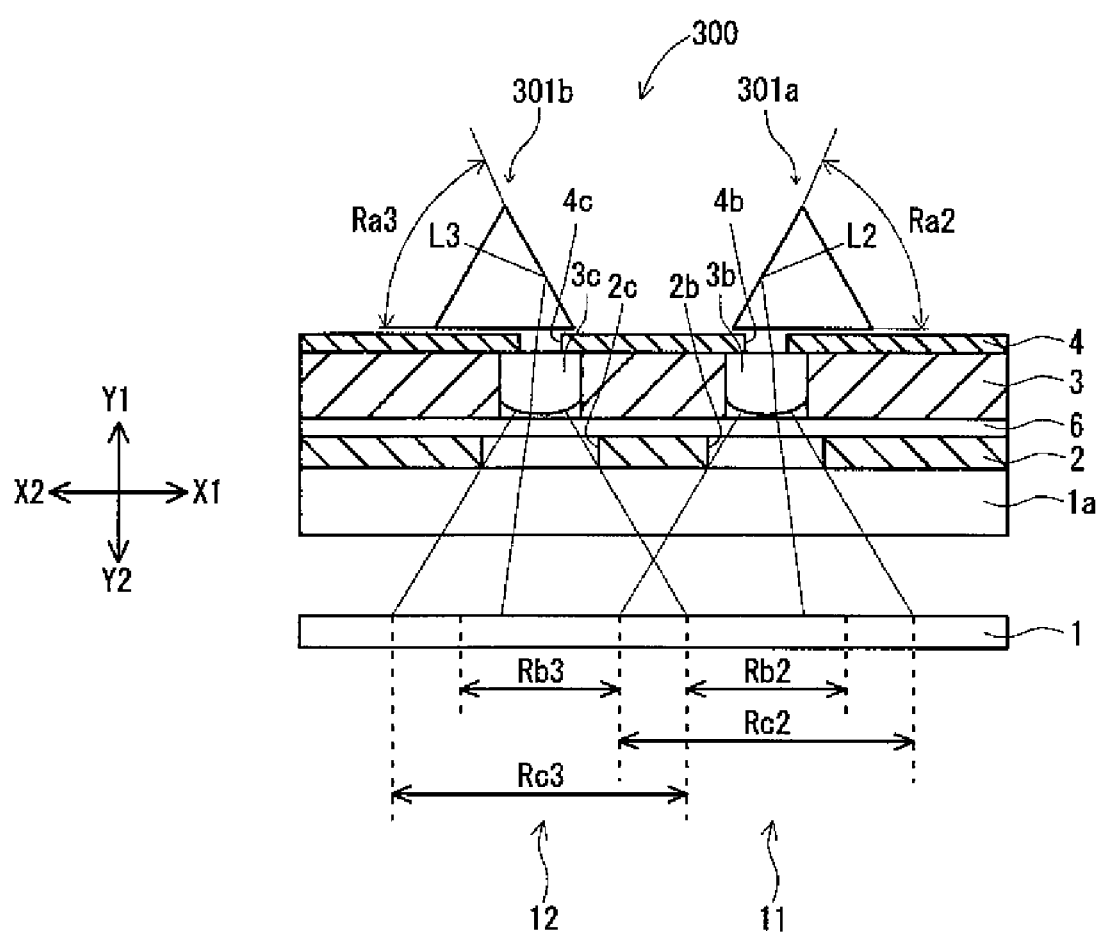
FIG. 8 is a cross-sectional view illustrating an image pickup apparatus according to a second modified example of the present embodiment.

In the aforementioned embodiment, there has been described a case where the prisms 5a and 5b are formed to have a right isosceles triangle shape in a plane view, and the lenses 3a to 3c have a view angle of about 40 degrees. However, the present invention is not limited thereto. As in an image pickup apparatus 300 illustrated in FIG. 8 according to a second modified example of the present embodiment, the prisms 301*a* and 301*b* may be formed to have a regular triangle shape in a plane view, and the lenses 3*a* to 3*c* may have a view angle of about 60 degrees. With this structure, it is possible to pick-up a panoramic image with an angular range of about 180 degrees.

Figure 9:
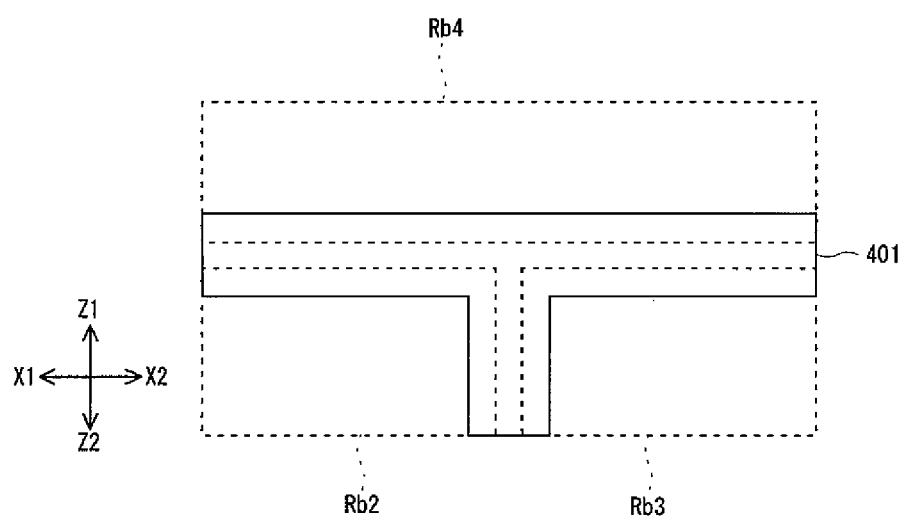
FIG. 9 is a view illustrating an image pickup apparatus according to a third modified example of the present embodiment.
Figure 10:
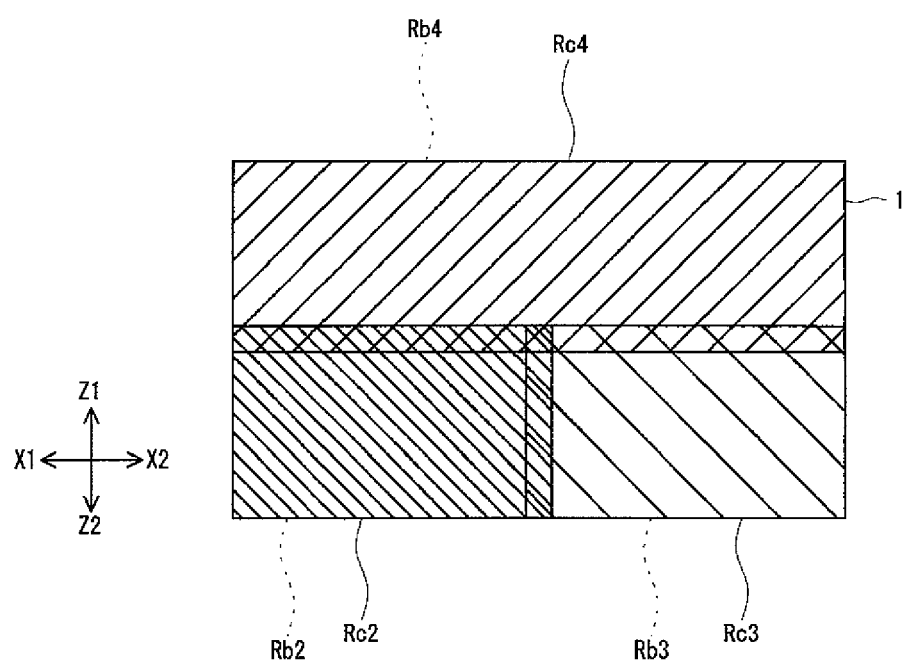
FIG. 10 is a view illustrating the image pickup apparatus according to the third modified example of the present embodiment.

In the aforementioned embodiment, there has been described a case where the partition wall 2 having the opening portions 2*a* to 2*c* is provided. However, the present invention is not limited thereto. As in a third modified example of the present embodiment illustrated in FIG. 9, a T-shaped partition wall 401 may be provided. With this structure, it is possible to maximize the size of the image pickup areas Rb4, Rb2 and Rb3 corresponding to three units 10, 11 and 12, as illustrated in FIG. 9 and FIG. 10.

In the aforementioned embodiment, there has been described a case where the prism 5*a* (5*b*) is employed as the first optical-path changing member (the second optical-path changing member). However, the present invention is not limited thereto. A pair of mirrors may be employed as the first optical-path changing member (the second optical-path changing member).

In the aforementioned embodiment, there has been described a case where the image pickup areas Rb1, Rb2 and Rb3 are formed inside the light-ray reaching areas Rc1, Rc2 and Rc3, respectively. However, the present invention is not thereto. The light-ray reaching areas Rc1, Rc2 and Rc3 may be formed to have substantially the same sizes as those of the image pickup areas Rb1, Rb2 and Rb3, respectively, by adjusting sizes of the opening portions 2*a* to 2*c* of the partition wall 2.

Further, in the aforementioned embodiment, although there has been described a case where the lenses 3*a* to 3*c* are plano-convex lenses, the present invention is not limited thereto. The lenses 3*a* to 3*c* may be double-convex lenses and the like.

What is claimed is:

1. An image pickup apparatus comprising a first lens for converging light incident thereto through a first area, the image pickup apparatus further comprising:
    a first optical-path changing member to which light is incident through a second area at a right of the first area;
    a second lens for converging the light emitted from the first optical-path changing member;
    a second optical-path changing member to which light is incident through a third area at a left of the first area; and
    a third lens for converging the light emitted from the second optical-path changing member;
    wherein the first lens, the second lens and the third lens are placed at areas corresponding to the vertices of a triangle in a front view.

2. The image pickup apparatus according to claim 1, wherein the first lens is placed such that a distance from the first lens to the second lens is substantially equal to a distance from the first lens to the third lens, and
    a line connecting the first lens and the second lens and a line connecting the first lens and the third lens form substantially the same angle to a line connecting the second lens and the third lens.

3. The image pickup apparatus according to claim 1, further comprising:
    an image pickup device to which light is incident through the first, second and third lenses; and
    a light shielding member provided between the first, second and third lenses and the image pickup device.

4. The image pickup apparatus according to claim 1, wherein the first optical-path changing member is provided at an area corresponding to the second lens, and
    the second optical-path changing member is provided at an area corresponding to the third lens.

* * * * *